US011597803B2

(12) United States Patent
Lee et al.

(10) Patent No.: US 11,597,803 B2
(45) Date of Patent: Mar. 7, 2023

(54) SUPERABSORBENT POLYMER AND METHOD FOR PREPARING THE SAME

(71) Applicant: LG Chem, Ltd., Seoul (KR)

(72) Inventors: Hyemin Lee, Daejeon (KR); Taebin Ahn, Daejeon (KR); Hyunsup Lee, Daejeon (KR); Yeon Soo Kim, Daejeon (KR)

(73) Assignee: LG Chem, Ltd.

( * ) Notice: Subject to any disclaimer, the term of this patent is extended or adjusted under 35 U.S.C. 154(b) by 155 days.

(21) Appl. No.: 17/229,138

(22) Filed: Apr. 13, 2021

(65) Prior Publication Data

US 2021/0230377 A1    Jul. 29, 2021

Related U.S. Application Data

(62) Division of application No. 16/335,036, filed as application No. PCT/KR2018/000548 on Jan. 11, 2018, now Pat. No. 11,034,800.

(30) Foreign Application Priority Data

Feb. 10, 2017   (KR) .................. 10-2017-0018679

(51) Int. Cl.
*C08J 3/12* (2006.01)
*C08J 3/24* (2006.01)
*C08K 3/22* (2006.01)
*C08J 3/075* (2006.01)
*C08K 5/101* (2006.01)
*C08K 3/36* (2006.01)

(52) U.S. Cl.
CPC .............. *C08J 3/075* (2013.01); *C08J 3/12* (2013.01); *C08J 3/24* (2013.01); *C08K 3/22* (2013.01); *C08K 5/101* (2013.01); *C08J 2333/08* (2013.01); *C08J 2333/10* (2013.01); *C08K 3/36* (2013.01); *C08K 2003/2237* (2013.01); *C08K 2003/2244* (2013.01)

(58) Field of Classification Search
CPC ....... C08J 3/075; C08J 3/12; C08J 3/24; C08J 2333/08; C08J 2333/10; C08J 3/245; C08J 3/128; C08J 2300/14; C08K 3/22; C08K 5/101; C08K 3/36; C08K 2003/2237; C08K 2003/2244
USPC ........................................................ 523/201
See application file for complete search history.

(56) References Cited

U.S. PATENT DOCUMENTS

| | | | |
|---|---|---|---|
| 5,140,076 A | 8/1992 | Hatsuda et al. | |
| 5,562,646 A | 10/1996 | Goldman et al. | |
| 8,497,226 B2 | 7/2013 | Torii et al. | |
| 10,414,876 B2 | 9/2019 | Jang et al. | |
| 10,702,626 B2 | 7/2020 | Choi et al. | |
| 11,034,800 B2* | 6/2021 | Lee | C08J 3/24 |
| 11,034,802 B2* | 6/2021 | Ahn | C08K 3/22 |
| 2006/0029782 A1 | 2/2006 | Harren et al. | |
| 2007/0207924 A1 | 9/2007 | Ikeuchi et al. | |
| 2009/0131255 A1 | 5/2009 | Ikeuchi et al. | |
| 2009/0298685 A1 | 12/2009 | Torii et al. | |
| 2016/0311985 A1 | 10/2016 | Jung et al. | |
| 2017/0009026 A1 | 1/2017 | Nam et al. | |
| 2017/0189575 A1 | 7/2017 | Lee et al. | |
| 2017/0361305 A1* | 12/2017 | Kim | B01J 20/261 |
| 2018/0001300 A1 | 1/2018 | Nakatsuru et al. | |
| 2018/0304232 A1 | 10/2018 | Nam et al. | |
| 2018/0312645 A1 | 11/2018 | Lee et al. | |
| 2019/0099739 A1 | 4/2019 | Lee et al. | |
| 2019/0315930 A1 | 10/2019 | Kim et al. | |
| 2019/0344243 A1 | 11/2019 | Lee et al. | |
| 2020/0009530 A1 | 1/2020 | Ahn et al. | |
| 2020/0216623 A1 | 7/2020 | Ahn et al. | |
| 2020/0398251 A1* | 12/2020 | Choi | B29B 9/02 |
| 2021/0008521 A1* | 1/2021 | Choi | C08F 2/50 |
| 2022/0080387 A1* | 3/2022 | Hur | C08J 3/245 |
| 2022/0098373 A1* | 3/2022 | Park | C08K 5/1515 |

FOREIGN PATENT DOCUMENTS

| | | |
|---|---|---|
| CN | 108350188 A | 7/2018 |
| EP | 2535027 A1 | 12/2012 |
| JP | 2009509723 A | 3/2009 |

(Continued)

OTHER PUBLICATIONS

Search Report from Chinese Office Action for Application No. 201880004156.3 dated Apr. 8, 2021; 2 pages.
Schwalm, Reinhold, "UV Coatings: Basics, Recent Developments and New Applications." Elsevier Science, Dec. 21, 2006, p. 115.
Odian, George, "Principles of Polymerization." Second Edition, 1981, John Wiley & Sons, Inc., p. 203.
International Search Report for PCT/KR2018/000548 dated May 8, 2018.

(Continued)

*Primary Examiner* — Hannah J Pak

(74) *Attorney, Agent, or Firm* — Lerner, David, Littenberg, Krumholz & Mentlik, LLP

(57) ABSTRACT

The present invention relates to a superabsorbent polymer that not only has excellent basic absorption performance, but also exhibits more improved absorption speed, permeability, etc., and a method for preparing the same. The superabsorbent polymer includes a base polymer powder including: a first crosslinked polymer of water soluble ethylenically unsaturated monomers having acid groups of which at least a part are neutralized; and a surface crosslink layer that is formed on the base polymer powder, and further includes a second crosslinked polymer in which the first crosslinked polymer is additionally crosslinked by a C2-5 alkylene carbonate, wherein an absorption degree, SFC, an absorption speed, and a porosity fulfill specific ranges.

6 Claims, No Drawings

(56) References Cited

FOREIGN PATENT DOCUMENTS

| | | |
|---|---|---|
| JP | 2015501684 A | 1/2015 |
| JP | 2017502108 A | 1/2017 |
| KR | 100143402 B1 | 7/1998 |
| KR | 20070007162 A | 1/2007 |
| KR | 20150020030 A | 2/2015 |
| KR | 20150067729 A | 6/2015 |
| KR | 20150142636 A | 12/2015 |
| KR | 20160061743 A | 6/2016 |
| KR | 101750013 B1 | 6/2017 |
| WO | 2004069915 A2 | 8/2004 |
| WO | 2007037522 A1 | 4/2007 |
| WO | 2013078109 A1 | 5/2013 |
| WO | 2016111223 A1 | 7/2016 |

OTHER PUBLICATIONS

Third Party Obervation for Application No. PCT/KR2018/000548 dated May 31, 2019.

\* cited by examiner

SUPERABSORBENT POLYMER AND METHOD FOR PREPARING THE SAME

CROSS-REFERENCE TO RELATED APPLICATIONS

This application is a divisional of U.S. application Ser. No. 16/335,036, filed on Mar. 20, 2019, which is a national phase entry under 35 U.S.C. § 371 of International Application No. PCT/KR2018/000548, filed Jan. 11, 2018, which claims priority to Korean Patent Application No. 10-2017-0018679, filed Feb. 10, 2017, the disclosures of which are hereby incorporated by reference.

TECHNICAL FIELD

The present invention relates to a superabsorbent polymer that not only has excellent basic absorption performance, but also exhibits more improved absorption speed, permeability, etc., and a method for preparing the same.

BACKGROUND ART

A superabsorbent polymer (SAP) is a synthetic polymer material that can absorb moisture of 500 to 1000 times its own weight, and is also called a superabsorbent material (SAM), an absorbent gel material (AGM), etc. according to developing companies. The superabsorbent polymer began to be commercialized for sanitary items, and currently, it is being widely used for hygienic goods such as disposable diapers and so on, water-holding materials for soil, water stop materials for civil engineering and architecture, sheets for raising seedling, freshness preservatives in the field of food circulation, a fomentation material, etc.

In most cases, such a superabsorbent polymer is being widely used in the field of hygienic goods such as for diapers, sanitary pads, etc., and for such use, it is required to exhibit high absorption power to moisture, etc., and the absorbed moisture should not escape even under external pressure, and in addition, it should properly maintain its shape even when it absorbs water and the volume is expanded (swollen), while exhibiting excellent permeability.

Recently, with increasing demand for thin diapers, there has been a tendency of decreasing the content of fiber materials such as pulp, etc., in the diapers, with a consequential relative increase in the content of the superabsorbent polymer. Thus, the superabsorbent polymer is required to compensate for the performance of fiber materials of a diaper, and for this, the superabsorbent polymer should have high absorption speed and permeability as well as high absorption capacity.

In order for a superabsorbent polymer to exhibit the above-explained high permeability, basically, superabsorbent polymer particles should absorb moisture and maintain their shape even after being swollen, thus maintaining voids between the particles. This is because the voids between particles can function as a pathway, thus securing excellent permeability of the superabsorbent polymer. For this reason, in order to provide a superabsorbent polymer exhibiting more improved permeability and excellent properties, the superabsorbent polymer should have high gel strength.

Further, in order for the superabsorbent polymer to exhibit higher absorption speed, it should have a porous structure in which multiple micropores are formed, or the internal crosslinking density should be controlled to be relatively low.

However, when a superabsorbent polymer having the porous structure or low internal crosslinking density is prepared, gel strength of the superabsorbent polymer tends to be lowered, and thus a superabsorbent polymer simultaneously having improved permeability and absorption speed has not been properly developed so far.

Further, it is generally known that basic absorption power of a superabsorbent polymer is lowered if the gel strength of the superabsorbent polymer is to be increased, and thus, there is a technical difficulty in improving gel strength and permeability while maximally maintaining excellent absorption power of the superabsorbent polymer.

Therefore, there is a continued demand for the development of a technology capable of providing a superabsorbent polymer that simultaneously exhibits more improved permeability and absorption speed while maintaining excellent absorption performance.

DETAILED DESCRIPTION

Technical Problems

It is an object of the present invention to provide superabsorbent polymer that not only has excellent basic absorption performance, but also exhibits more improved absorption speed, permeability, etc., and a method for preparing the same.

Technical Solutions

The present invention provides a superabsorbent polymer including:

a base polymer powder including a first crosslinked polymer of water soluble ethylenically unsaturated monomers having acid groups of which at least a part are neutralized; and a surface crosslink layer that is formed on the base polymer powder, and includes a second crosslinked polymer, in which the first crosslinked polymer is additionally crosslinked by a C2-5 alkylene carbonate, wherein an absorption degree represented by the following Formula 1 is 45 to 65 g/g, saline flow conductivity (SFC; $\cdot 10^{-7}$ cm$^3$·s/g) for a saline solution (0.685 wt % sodium chloride aqueous solution) is 40 to 180 ($\cdot 10^{-7}$ cm$^3$·s/g), and a 30-second absorption speed for a saline solution at pressure of 0.3 psi is 1.5 mm/min or more, and porosity is 20% or more.

$$\text{Absorption degree}=CRC+AUP \qquad \text{[Formula 1]}$$

In Formula 1,

CRC denotes centrifuge retention capacity of the superabsorbent polymer for a saline solution (0.9 wt % sodium chloride aqueous solution) for 30 minutes, and AUP denotes absorbency at pressure of the superabsorbent polymer for a saline solution (0.9 wt % sodium chloride aqueous solution) of under 0.7 psi for 1 hour.

Further, the present invention provides a superabsorbent polymer including:

a base polymer powder including a first crosslinked polymer of water soluble ethylenically unsaturated monomers having acid groups of which at least a part are neutralized; and a surface crosslink layer that is formed on the base polymer powder, and includes a second crosslinked polymer, in which the first crosslinked polymer is additionally crosslinked by a C2-5 alkylene carbonate, wherein an absorption degree represented by the above Formula 1 is 45 to 65 g/g, saline flow conductivity (SFC; ·$10^{-7}$ cm$^3$·s/g) for a saline solution (0.685 wt % sodium chloride aqueous solution) is 48 to 180 (·$10^{-7}$ cm$^3$·s/g), and a 30-second absorption speed for a saline solution at pressure of 0.3 psi is 1.5 mm/min to 3.0 mm/min.

The present invention also provides a method for preparing a superabsorbent polymer, including the steps of:

conducting crosslinking polymerization of water soluble ethylenically unsaturated monomers having acid groups of which at least a part are neutralized, in the presence of an internal crosslinking agent, to form a hydrogel polymer including a first crosslinked polymer and having gel strength of 10,000 Pa or more;

gel grinding the hydrogel polymer such that gel strength after the grinding becomes 35% to 90% of gel strength before the grinding;

drying, grinding, and sieving the gel ground hydrogel polymer to form a base polymer powder;

adding hydrophobic inorganic particles having a water contact angle of 50° or more to the base polymer powder; and heat treating the base polymer powder to which the hydrophobic inorganic particles are added, to progress surface crosslinking, in the presence of a surface crosslinking solution including hydrophilic inorganic particles having a water contact angle of 10° or less, and a surface crosslinking agent of a C2-5 alkylene carbonate.

Hereinafter, superabsorbent polymer and a method for preparing the same according to specific embodiments of the present invention will be explained in detail. However, these are presented only as the illustrations of the present invention, the scope of the right of the invention is not limited thereby, and it is obvious to one of ordinary knowledge in the art that various modifications can be made to the embodiments within the scope of the right of the invention.

Further, throughout the specification, unless specifically mentioned, the word "comprising" or "containing" means to include any construction element (or constructional components) without specific limitations, and it is not to be interpreted as excluding the addition of other construction elements (or constructional components).

According to one embodiment of the present invention, provided is superabsorbent polymer including; a base polymer powder including a first crosslinked polymer of water soluble ethylenically unsaturated monomers having acid groups of which at least a part are neutralized; and a surface crosslink layer that is formed on the base polymer powder, and includes a second crosslinked polymer in which the first crosslinked polymer is additionally crosslinked by a C2-5 alkylene carbonate, wherein an absorption degree represented by the following Formula 1 is 45 to 65 g/g, saline flow conductivity (SFC; ·$10^{-7}$ cm$^3$·s/g) for a saline solution (0.685 wt % sodium chloride aqueous solution) is 40 to 180 (·$10^{-7}$ cm$^3$·s/g), a 30-second absorption speed for a saline solution at pressure of 0.3 psi is 1.5 mm/min or more, and porosity is 20% or more.

As the result of continuous experiments of the present inventors, it was confirmed that if a superabsorbent polymer is prepared by obtaining a hydrogel polymer having high gel strength by controlling the condition of crosslinking polymerization, and maintaining the gel strength after gel grinding within an appropriate range by controlling the gel grinding condition, and then progressing surface crosslinking using specific inorganic particles, according to the preparation method described below, a superabsorbent polymer that not only has excellent basic absorption performance, but also has largely improved permeability and absorption speed can be prepared and provided, and the present invention was completed.

That is, by obtaining a hydrogel polymer basically having high gel strength, and controlling gel grinding conditions so that the gel strength of the hydrogel polymer may be maintained beyond a certain level even after gel grinding, a base polymer powder exhibiting relatively high gel strength can be provided. In addition, in case a surface crosslinking process is progressed using multiple kinds of inorganic particles, such inorganic particles are uniformly distributed on the base polymer powder, and a surface crosslink layer having a thickness beyond a certain level can be uniformly formed. Thus, the formed superabsorbent polymer of one embodiment may exhibit more improved gel strength on the whole, because the base powder polymer and/or surface crosslink layer included therein have higher and more uniform strength. As the result, the superabsorbent polymer of one embodiment may exhibit excellent permeability defined by a relatively high SFC, etc., and absorbency under pressure defined by a high AUP, etc.

Further, since the base polymer powder and the superabsorbent polymer include multiple pores, and thus have porosities beyond a certain level, and have wide surface areas can be obtained by progressing gel grinding under the specific conditions, the superabsorbent polymer of one embodiment may exhibit more improved absorption speed defined by the properties such as 30-second absorption speed, etc.

In addition, by maintaining gel strength after grinding beyond a certain level by controlling the gel grinding conditions, after obtaining a hydrogel polymer basically having high gel strength, the superabsorbent polymer of one embodiment obtained through the method may exhibit reduced deterioration of absorption performance.

Thus, the superabsorbent polymer of one embodiment may maintain basic absorption performance to be excellent, and simultaneously, exhibit more improved absorption speed and permeability, and can be preferably applied for hygienic goods such as a diaper with a thinner thickness, etc.

Hereinafter, a superabsorbent polymer of one embodiment will be explained in more detail.

As used herein, 'superabsorbent polymer' means a superabsorbent polymer including: base polymer powder including a first crosslinked polymer of water soluble ethylenically unsaturated monomers having acid groups of which at least a part are neutralized; and a surface crosslink layer that is formed on the base polymer powder, and includes a second crosslinked polymer in which the first crosslinked polymer is additionally crosslinked by a surface crosslinking agent.

The water soluble ethylenically unsaturated monomers may be any monomers commonly used in the preparation of a superabsorbent polymer. As non-limiting examples, the water soluble ethylenically unsaturated monomer may be a compound represented by the following Chemical Formula 1.

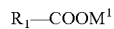  [Chemical Formula 1]

In Chemical Formula 1, $R_1$ is a C2-5 alkyl group including an unsaturated bond, and $M^1$ is a hydrogen atom, a monovalent or divalent metal, an ammonium group, or an organic amine salt.

Suitably, the monomers may be one or more selected from the group consisting of acrylic acid and methacrylic acid, and monovalent metal salts, divalent metal salts, ammonium salts, and organic amine salts of these acids. It is favorable that acrylic acid or a salt thereof is used as the water soluble ethylenically unsaturated monomer, because a superabsorbent polymer with improved absorption property can thereby be obtained. In addition, as the monomers, one or more selected from the group consisting of anionic monomers and salts thereof selected from maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methylpropane sulfonic acid; non-ionic hydrophilic group-containing monomers selected from (meth)acrylamide, N-substituted (meth)acrylate, 2-hydroxyethyl (meth)acrylate, 2-hydroxypropyl (meth)acrylate, methoxy polyethylene glycol (meth)acrylate, and polyethylene glycol (meth)acrylate; and amino group-containing unsaturated monomers selected from (N,N)-dimethylaminoethyl (meth)acrylate and (N,N)-dimethylaminopropyl (meth)acrylamide, and quaternized products thereof, may be used.

Here, the water soluble ethylenically unsaturated monomers may have acid groups, and at least a part of the acid groups may be neutralized. Preferably, monomers that are partially neutralized with an alkali substance such as sodium hydroxide, potassium hydroxide, ammonium hydroxide, etc. may be used.

Here, the neutralization degree of the monomers may be 40 to 95 mol %, 40 to 80 mol %, or 45 to 75 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit a rubber-like property, which is difficult to handle.

The 'first crosslinked polymer' means a material wherein the above-explained water soluble ethylenically unsaturated monomers are crosslinked in the presence of an internal crosslinking agent, and the 'base polymer powder' means a material including the first crosslinked polymer. Further, the 'second crosslinked polymer' means a material wherein the first crosslinked polymer is additionally crosslinked by a surface crosslinking agent, and thus it is formed on the base polymer powder. The surface crosslinking agent will be described later.

The superabsorbent polymer of one embodiment has excellent basic absorption performance under pressure or under no pressure, absorption speed, and permeability, which may be defined by the properties such as CRC, AUP, absorption degree, SFC, 30-second absorption speed, porosity, FSR, etc.

Specifically, centrifuge retention capacity (CRC) of the superabsorbent polymer of one embodiment for a saline solution (0.9 wt % sodium chloride aqueous solution) for 30 minutes may be 24 to 35 g/g, or 26 to 32 g/g. Such a centrifuge retention capacity (CRC) range may define excellent absorption performance under no pressure, exhibited by the superabsorbent polymer of one embodiment.

The centrifuge retention capacity (CRC) for a saline solution may be calculated by the following Calculation Formula 1, after a saline solution is absorbed in a superabsorbent polymer for 30 minutes.

$$CRC(g/g)=\{[W_2(g)-W_1(g)-W_0(g)]/W_0(g)\} \quad \text{[Calculation Formula 1]}$$

In Calculation Formula 1, $W_0$ (g) is the initial weight of the superabsorbent polymer, $W_1$ (g) the weight of an envelope made of nonwoven fabric in which the superabsorbent polymer is not introduced, measured after the envelope without the superabsorbent polymer was soaked in a saline solution at room temperature for 30 minutes, and then drained using a centrifuge at 250 G for 3 minutes, and $W_2$ (g) is the weight of an envelope made of a nonwoven fabric in which the superabsorbent polymer is introduced, measured after the envelope including the superabsorbent polymer was soaked in a saline solution at room temperature for 30 minutes, and then drained using a centrifuge at 250 G for 3 minutes.

Further, absorbency under pressure (AUP) of the superabsorbent polymer according to one embodiment may be 22 to 28 g/g, or 23 to 27 g/g. Such absorbency under pressure (AUP) at a range may define excellent absorption performance under pressure, exhibited by the superabsorbent polymer of one embodiment.

The absorbency under pressure (AUP) may be calculated according to the following Calculation Formula 2, after a saline solution is absorbed in superabsorbent polymer under pressure of 0.7 psi for 1 hour.

$$AUP(g/g)=[W_4(g)-W_3(g)]/W_0(g) \quad \text{[Calculation Formula 2]}$$

In Calculation Formula 2, $W_0$ (g) is the initial weight (g) of the superabsorbent polymer, $W_3$ (g) is the sum of the weight of the superabsorbent polymer and the weight of the apparatus capable of imparting a load to the superabsorbent polymer, and $W_4$ (g) is the sum of the weight of the superabsorbent polymer and the weight of the apparatus capable of imparting a load to the superabsorbent polymer, after a saline solution is absorbed in the superabsorbent polymer under load (0.7 psi) for 1 hour.

Further, since the superabsorbent polymer of one embodiment exhibits centrifuge retention capacity (CRC) and absorbency under pressure (AUP) of the above-explained ranges, the absorbent degree of the superabsorbent polymer defined by the Formula 1 may be 45 to 65 g/g or 50 to 60 g/g. Thus, the superabsorbent polymer of one embodiment exhibits excellent basic absorption property and absorption performance such as absorption maintenance under pressure, etc., and thus can be suitably used for various hygienic goods.

Further, a saline flow conductivity (SFC, $10^{-7}$ cm$^3$·s/g) of the superabsorbent polymer of one embodiment for a saline solution (0.685 wt % sodium chloride aqueous solution) may be 40 to 180 ($\cdot 10^{-7}$ cm$^3$·s/g), or 48 to 180 ($\cdot 10^{-7}$ cm$^3$·s/g), or 48 to 150 ($\cdot 10^{-7}$ cm$^3$·s/g), or 60 to 130 ($\cdot 10^{-7}$ cm$^3$·s/g).

The saline flow conductivity (SFC) may be measured and calculated by a method that is well known to one of ordinary knowledge in the art, for example, by a method disclosed in U.S. Pat. No. 5,562,646, col. 54 to col. 59.

Since the superabsorbent polymer includes a base polymer powder maintaining high gel strength, and a surface crosslink layer of which surface crosslinking is progressed under specific conditions and thus has high strength, it has high gel strength on the whole, and thus may exhibit more improved saline flow conductivity (SFC) and excellent permeability.

More specifically, the superabsorbent polymer may exhibit horizontal direction gel strength G' of 8500 to 18,000 Pa, or 8500 to 15,000 Pa.

The horizontal direction gel strength G' may better reflect excellent permeability under a practical use environment of the superabsorbent polymer. That is, when the superabsorbent polymer is included in hygienic goods such a diapers, etc., the permeability of the common superabsorbent polymer may be determined more relationally according to whether or not it exhibits excellent shape maintenance and high gel strength despite a force applied in a horizontal direction, and the horizontal direction gel strength may properly reflect gel strength directly related to permeability. Thus, since the superabsorbent polymer of one embodiment fulfilling the above-explained range of horizontal direction gel strength G' exhibits excellent permeability, it can be very preferably used for hygienic goods such as diapers, etc.

Such horizontal direction gel strength G' may be measured by a method including the following steps, using a commercialized rheometer, after a saline solution is absorbed in the superabsorbent polymer for 1 hour:

1) a step of allowing the superabsorbent polymer to absorb a saline solution to swell the superabsorbent polymer;

2) positioning the swollen superabsorbent polymer between plates of a rheometer having a predetermined gap and pressurizing both plate sides;

3) while increasing shearing strain using a rheometer under vibration, confirming shearing strain of a linear viscoelastic regime region in which a storage modulus and a loss modulus are constant; and 4) measuring the storage modulus and loss modulus of the swollen superabsorbent polymer under the above-confirmed shearing strain, and measuring the average value of the storage modulus as gel strength.

Meanwhile, when about 0.16 g of the superabsorbent polymer is swollen under pressure of 0.3 psi by a saline solution introduced through a mesh at the lower part of a cylinder, the 30-second absorption speed of the superabsorbent polymer of one embodiment may be 1.5 mm/min or more, 1.7 mm/min to 3.0 mm/min, or 1.8 mm/min to 2.6 mm/min. Such a 30-second absorption speed may be measured and calculated by dividing a height change of the upper plate of a rheometer according to the volume expansion of the superabsorbent polymer by an absorption time (30 seconds).

Since the superabsorbent polymer exhibits high gel strength and the resulting excellent permeability, and yet has a porous structure therein because gel grinding conditions are controlled during the preparation process, it may simultaneously exhibit excellent absorption speed defined by the above-explained 30-second absorption speed. Thus, the superabsorbent polymer may be preferably used in hygienic goods with decreased contents of fiber such as pulp, etc.

The superabsorbent polymer may have a porous structure fulfilling porosity of 20% or more, 20% to 40%, 21% to 30%, or 21% to 27%, so that the superabsorbent polymer of one embodiment may exhibit excellent absorption speed and permeability as explained above. By fulfilling such a porosity range, the superabsorbent polymer not only exhibits excellent absorption speed, but also exhibits excellent permeability without an adverse effect on high gel strength by the porous structure.

Such porosity can be measured simultaneously when measuring the 30-second absorption speed of the superabsorbent polymer as explained above, and it can be calculated by subtracting the volume of absorbed saline solution measured through a moisture content measuring apparatus from the total volume (the final absorption height*the area of the lower part of a cylindrical cylinder) inside a cylinder, when the swelling of the superabsorbent polymer is finished during the measuring process of the 30-second absorption speed.

As explained above, the superabsorbent polymer of one embodiment may include a base polymer powder having a porous structure and a large surface area, because the gel grinding conditions of the hydrogel polymer are optimized during the preparation process. Thus, the superabsorbent polymer may exhibit more improved absorption speed than was known previously.

Further, the free swell rate (FSR) of the superabsorbent polymer of one embodiment, when 1 g of the superabsorbent polymer absorbs 20 g of a 0.9 wt % sodium chloride aqueous solution, may be 0.30 g/g/s or more, or 0.31 g/g/s or more. Although the upper range of the FSR is not limited, for example, it may be 0.40 g/g/s or less, 0.39 g/g/s or less, 0.38 g/g/s or less, 0.37 g/g/s or less, or 0.36 g/g/s or less. Such an FSR range may define high absorption speed exhibited by the superabsorbent polymer of one embodiment.

Meanwhile, in the superabsorbent polymer of one embodiment, the first crosslinked polymer may be formed by crosslinking polymerization of the monomers, in the presence of a polyol poly(meth)acrylate-based first internal crosslinking agent selected from the group consisting of trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri (meth)acrylate, and pentaerythritol tetraacrylate; and an allyl(meth)acrylate-based second internal crosslinking agent. By using the two or more kinds of specific internal crosslinking agents, the superabsorbent polymer of one embodiment includes a base polymer powder that maintains high gel strength even after progressing gel grinding, etc., and thus exhibits excellent permeability and absorption performance under pressure, etc.

Further, during the surface crosslinking of the superabsorbent polymer, inorganic particles, more specifically, hydrophobic inorganic particles having a water contact angle of 50° or more, or 50° to 175°, and hydrophilic inorganic particles having a water contact angle of 10° or less, or 1 to 10°, may be used. Thus, the superabsorbent polymer of one embodiment may further include inorganic particles dispersed in the surface crosslink layer on the base polymer powder. More specifically, the superabsorbent polymer may further include hydrophobic inorganic particles and hydrophilic inorganic particles dispersed on the base polymer powder. At least a part of the hydrophobic inorganic particles may exist on the surface of the base polymer powder (for example, in the surface crosslink layer), and the other part may be stuck on the surface of the base polymer powder or buried inside. Further, the hydrophilic inorganic particles may be stuck in the crosslink structure of the second crosslinked polymer of the surface crosslink layer, or on the surface of the surface crosslink layer.

As such, since the inorganic particles for the improvement in permeability exist at least on the base polymer powder, the permeability improvement thereby may be maintained continuously despite passage of time, and particularly, even if an external force is applied, high gel strength and improved permeability may be maintained.

As the hydrophobic inorganic particles, one or more selected from the group consisting of silica particles, titania particles, and zirconia particles having the above-explained contact angle range may be used, and as the hydrophilic inorganic particles, one or more selected from the group consisting of silica particles, titania particles, zirconia particles, and laponite particles having the contact angle range of 10° or less may be used.

In addition, the water contact angle classifying the hydrophilic and hydrophobic inorganic particles may be defined as a contact angle to water of the inorganic particles coated on a glass substrate. A specific measuring method of such a contact angle is described in the examples below.

The superabsorbent polymer of the above-explained one embodiment may have a particle diameter of 150 to 850 μm. More specifically, 95 wt % or more of the base polymer powder and superabsorbent polymer including the same may have a particle diameter of 150 to 850 μm, and less than 3 wt % thereof may have a particle diameter of less than 150 μm.

Meanwhile, the superabsorbent polymer fulfilling the properties of the above-explained embodiment may be prepared by a method including the steps of obtaining a hydrogel polymer that exhibits higher gel strength by controlling crosslinking polymerization conditions, and then maintaining the gel strength after grinding at a certain level by controlling gel grinding conditions, and progressing surface crosslinking in the presence of specific inorganic particles.

Thus, according to another embodiment of the invention, a method for preparing the above-explained superabsorbent polymer is provided. Such a preparation method includes the steps of: progressing crosslinking polymerization of water soluble ethylenically unsaturated monomers having acid groups of which at least a part are neutralized, in the presence of an internal crosslinking agent, to form a hydrogel polymer including a first crosslinked polymer and having gel strength of 10,000 Pa or more; gel grinding the hydrogel polymer such that a gel strength after the grinding becomes 35% to 90% of a gel strength before the grinding; drying, grinding, and sieving the gel ground hydrogel polymer to form a base polymer powder; adding hydrophobic inorganic particles having a water contact angle of 50° or more to the base polymer powder; and heat treating the base polymer powder to which the hydrophobic inorganic particles are added, to progress surface crosslinking, in the presence of a surface crosslinking solution including hydrophilic inorganic particles having a water contact angle of 10° or less, and a surface crosslinking agent of a C2-5 alkylene carbonate.

Hereinafter, the preparation method will be explained in detail according to each step.

First, the preparation method includes a step of forming a hydrogel polymer by crosslinking polymerization. Specifically, the thermal polymerization or photopolymerization of a monomer composition including water soluble ethylenically unsaturated monomers and polymerization initiators is progressed in the presence of an internal crosslinking agent to form a hydrogel polymer.

The water soluble ethylenically unsaturated monomers included in the monomer composition is as explained above.

Further, the monomer composition may include a polymerization initiator commonly used in the preparation of a superabsorbent polymer. As non-limiting examples, as the polymerization initiator, a thermal polymerization initiator or a photopolymerization initiator may be used according to polymerization methods. However, even in the case of photopolymerization, since a certain amount of heat is generated by UV irradiation, etc., and heat is generated to some degree according to the progression of an exothermic polymerization reaction, a thermal polymerization initiator may be additionally included.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. Among them, as the acyl phosphine may include commercially available Lucirin TPO, i.e., 2,4,6-trimethyl-benzoyl-trimethyl phosphine oxide, may be used. More various photopolymerization initiators are described in Reinhold Schwalm, "UV Coatings: Basics, Recent Developments and New Applications (Elsevier 2007)", page 115, and are not limited to the above-described examples.

Further, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitrile, 2,2-azobis [2-(2-imidazolin-2-yl)propane]dihydrochloride, 4,4-azobis-(4-cyanovalericacid), etc. More various thermal initiators are described in "Principles of Polymerization (Wiley, 1981)", Odian, page 203, and are not limited to the above described examples.

Such a polymerization initiator may be added at a concentration of about 0.001 to 1 wt %, based on the monomer composition. That is, if the concentration of the polymerization initiator is too low, the polymerization speed may become slow, and the remaining monomers may be extracted in a large quantity in the final product. To the contrary, if the concentration of the polymerization initiator is too high, the polymer chain making up a network may be shortened, and thus water soluble contents may increase and absorbency under pressure may be lowered, thus deteriorating the properties of the polymer.

Meanwhile, in the monomer composition, a crosslinking agent ("internal crosslinking agent") for the improvement of the properties of the polymer formed by the polymerization of the water soluble ethylenically unsaturated monomers is included. The crosslinking agent is for the internal crosslinking of the hydrogel polymer, and may be used separately from a "surface crosslinking agent" described below.

Particularly, in the preparation method, by using two or more kinds of internal crosslinking agents as explained above, for example, a polyol poly(meth)acrylate-based first internal crosslinking agent and an allyl (meth)acrylate-based second internal crosslinking agent together, a hydrogel polymer having higher gel strength, for example, 10,000 Pa or more, 11,000 Pa or more, or 120,000 Pa or more, and although not specifically limited, 40,000 Pa or less, 30,000 Pa or less, or 28,000 Pa or less, may be obtained.

More specifically, as the first internal crosslinking agent, one or more selected from the group consisting of trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, and pentaerythritol tetraacrylate may be used, and as the second internal crosslinking agent, allyl methacrylate, allyl acrylate, etc. may be used.

Further, the total contents of the first and second internal crosslinking agents may be 0.4 parts by weight to 2 parts by weight, or 0.4 to 1.8 parts by weight, based on 100 parts by weight of the monomer composition including the internal crosslinking agents, monomers, etc. In addition, the first internal crosslinking agent and the second internal crosslinking agent may be used at a weight ratio of 1:1 to 10:1. As such, by controlling the kinds and the content ranges of the internal crosslinking agents, and controlling the moisture content of the hydrogel polymer described below, a hydrogel polymer exhibiting gel strength of 10,000 Pa or more may be more effectively obtained, and a superabsorbent polymer fulfilling the properties of one embodiment may be more effectively obtained. However, if the content of the internal crosslinking agents is too high, basic absorption performance of the superabsorbent polymer may be deteriorated.

In addition, the monomer composition may further include additives such as a thickener, a plasticizer, a preservation stabilizer, an antioxidant, etc., as necessary.

Further, such a monomer composition may be prepared in the form of a solution in which the above-explained raw materials such as monomers, a polymerization initiator, internal crosslinking agents, etc. are dissolved in a solvent.

Here, the solvent that can be used is not limited in terms of its construction as long as it can dissolve or disperse the above-explained raw materials, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methylethylketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, etc. may be used alone or in combination.

Further, the formation of the hydrogel polymer through the polymerization of the monomer composition may be conducted by a common polymerization method, and the process is not specifically limited. As non-limiting examples, the polymerization method is largely classified into thermal polymerization and photopolymerization according to an energy source. Commonly, thermal polymerization may be progressed in a reactor equipped with a stirring axis such as a kneader, and photopolymerization may be progressed in a reactor equipped with a movable conveyer belt.

For example, the hydrogel polymer may be obtained by introducing the above-described monomer composition into a reactor equipped with a stirring axis such as a kneader, and supplying hot air or heating the reactor to progress thermal polymerization. Here, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition, the introduction speed, etc., and commonly, a hydrogel polymer with a (weight average) particle diameter of 2 to 50 mm may be obtained.

For another example, when photopolymerization of the monomer composition is progressed in a reactor equipped with a movable conveyer belt as explained above, a hydrogel polymer in the form of a sheet may be obtained. Here, the thickness of the sheet may vary according to the concentration of the introduced monomer mixture and the introduction speed, but in order to uniformly polymerize the whole sheet, and simultaneously secure production speed, it is preferable that the thickness is controlled to 0.5 to 10 cm.

The hydrogel polymer formed by the method may have a moisture content of 38 to 58 wt %, or 40 to 55 wt %. Such a moisture content may be controlled to a desired range by controlling the above-explained polymerization conditions. More specifically, in order to control the moisture content, the content of a solvent (for example, water) in the monomer composition provided for polymerization may be controlled, or the concentration of an alkali solution used to neutralize the water soluble ethylenically unsaturated monomers such as acrylic acid, etc. may be controlled. For example, the moisture content of the hydrogel polymer of 58 wt % or less may be achieved by controlling the concentration of an alkali material in the alkali solution (for example, the concentration of sodium hydroxide in the aqueous solution of sodium hydroxide) to 23 to 40%.

Here, the "moisture content" is the content of moisture based on the total weight of the hydrogel polymer, and it means a value obtained by subtracting the weight of the polymer in a dry state from the weight of the hydrogel polymer. Specifically, it is defined as a value calculated by measuring the weight loss according to moisture evaporation in the polymer while raising the temperature of the polymer through infrared heating to dry it. At this time, the drying condition may be set such that the temperature is raised from room temperature to about 180° C. and then maintained at 180° C., and the total drying time may be 20 minutes including a temperature raising step of 5 minutes.

By controlling the moisture content of the hydrogel polymer to the above-explained range, gel strength before gel grinding of 10,000 Pa or more may be more effectively achieved, and the subsequent gel grinding may be effectively progressed. Specifically, as a hydrogel polymer with controlled moisture content is introduced in a gel grinding apparatus (chopper, etc.) by controlling the polymerization conditions, and gel grinding conditions described below are controlled, high gel strength before gel grinding may be more easily achieved, and gel strength after gel grinding may be maintained within 35% to 90%, 50% to 89%, or 60% to 88% of the gel strength before grinding. Thus, the internal surface areas of the base polymer powder and superabsorbent polymer including the same may become wider, and thus, while the superabsorbent polymer may exhibit excellent absorption speed, the base polymer powder and the superabsorbent polymer may maintain high gel strength (namely, the strength rate before and after gel grinding may be appropriately maintained), thus exhibiting excellent permeability, rapid absorption speed, etc.

Meanwhile, after forming the hydrogel polymer by crosslinking polymerization, the hydrogel polymer with controlled moisture content is gel ground. The gel grinding may be progressed such that gel strength after grinding may become 35% to 90% of the gel strength before grinding. For example, the gel strength after gel grinding may become 7000 Pa to 30,000 Pa, or 10,000 Pa to 24,000 Pa, and thus a superabsorbent polymer fulfilling the properties of one embodiment may be more effectively obtained.

In the gel grinding step, grinders that can be used in the gel grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, and a disc cutter may be used, but is not limited thereto.

Meanwhile, during the gel grinding of the hydrogel polymer, a shearing force and a compressive force are applied to the hydrogel polymer, and according to the preparation method of another embodiment, by controlling such gel grinding conditions, the above-explained range of gel strength after gel grinding may be achieved.

More specifically, the gel grinding may be progressed in a grinder including an extruder equipped with a perforated plate such as a screw-type extruder, etc. Here, the multiple holes formed in the perforated plate may have a diameter of 9 to 15 mm, 9 to 13 mm, or 10 to 12 mm, and thus gel grinding may be progressed while pushing the hydrogel polymer through the perforated plate and extruder. Thereby, the hydrogel polymer may maintain an appropriate level of gel strength even after gel grinding, and gel grinding may be effectively progressed, and thus the polymer after grinding may have a large surface area.

That is, if the above-explained gel grinding process is progressed, the surface area of the ground hydrogel polymer may remarkably increase. Specifically, in the ground hydrogel polymer, the ratio of the number of sheared particles is 0.40 or more and 0.95 or less. The 'sheared particles' means particles wherein 3 or more concavities or pores with a depth of 10 μm or more are observed on the ground hydrogel polymer particles, and the 'ratio of the number of sheared particles' means the number of the sheared particles with respect to the total number of ground hydrogel polymer particles. As such, since sheared particles are produced to increase the surface area, the properties of the superabsorbent polymer such as absorption speed, etc. may be further improved, and a superabsorbent polymer fulfilling the properties of one embodiment can be more effectively prepared.

Meanwhile, the gel grinding of the hydrogel polymer may be conducted such that the particle diameter of the hydrogel polymer may become 0.1 mm to 10 mm. That is, in order to increase drying efficiency, it is preferable that the hydrogel polymer is ground to particles of 10 mm or less. However, since agglomeration between particles may be generated by excessive grinding, it is preferable that the hydrogel polymer is ground to particles of 0.1 mm or more.

Further, since the gel grinding of the hydrogel polymer is conducted at a relatively low moisture content, adhering of the hydrogel polymer to the surface of a gel grinder may occur. In order to minimize such a phenomenon, steam, water, a surfactant, an anti-agglomeration agent (for example, clay, silica, etc.); a persulfate-based initiator, an azo-based initiator, hydrogen peroxide, a thermal polymerization initiator, an epoxy-based crosslinking agent, a diol crosslinking agent, a multi-functional crosslinking agent including an acrylate, a monofunctional crosslinking agent including a hydroxyl group, etc. may be added to the hydrogel polymer, as necessary.

After the gel grinding, the hydrogel polymer may be dried. The drying may be conducted at a temperature of 120 to 250° C., preferably 140 to 200° C., and more preferably 150 to 190° C. Here, the drying temperature may be defined as the temperature of a heating medium supplied for drying or the temperature inside of a drying reactor including a heat medium and the polymer. If the drying temperature is low and the drying time lengthens, the process efficiency may be lowered, and in order to prevent this, it is preferable that the drying temperature is 120° C. or more. Further, if the drying temperature is higher than necessary, the surface of the hydrogel polymer may be excessively dried and much fine powder may be generated in the subsequent grinding process, and the properties of the final polymer may be deteriorated, and in order to prevent this, it is preferable that the drying temperature is 250° C. or less.

Although a drying time in the drying step is not specifically limited, considering process efficiency and the properties of the polymer, etc., it may be controlled to 20 to 90 minutes under the above drying temperature.

The drying may be achieved using common media, and for example, it may be conducted by hot wind supply, infrared ray irradiation, ultrahigh frequency wave irradiation, UV irradiation, etc.

Further, preferably, the drying is conducted such that the dried polymer has a moisture content of about 0.1 to 10 wt %. That is, if the moisture content of dried polymer is less than 0.1 wt %, due to excessive drying, a preparation cost may increase and degradation of crosslinked polymer may occur. In addition, if the moisture content of the dried polymer is greater than 10 wt %, defects may be generated in a subsequent process.

After the drying, the dried polymer may be ground, and thereby the particle diameter and surface area of the polymer may be controlled to appropriate ranges. The grinding may be conducted such that the particle diameter of the ground polymer becomes 150 to 850 μm.

As a grinder that can be used, common grinders such as a pin mill, a hammer mill, a screw mill, a roll mill, a disc mill, a jog mill, etc. may be used.

Further, in order to manage the properties of the finally productized superabsorbent polymer, a step of selectively sieving particles having a particle diameter of 150 to 850 μm in the polymer particles obtained through the grinding step may be further conducted.

Meanwhile, after passing through the above-explained sieving process to prepare the base polymer powder, in the presence of a surface crosslinking agent, the base polymer powder may be heat treated and surface crosslinked to form superabsorbent polymer particles. The surface crosslinking induces a crosslinking reaction on the surface of the base polymer powder in the presence of a surface crosslinking agent, and through the surface crosslinking, a surface modification layer (surface crosslink layer) may be formed on the surface of the base polymer powder.

More specifically, in the above-explained preparation method, surface crosslinking may be progressed by adding hydrophobic inorganic particles having a water contact angle of 50° or more; and heat treating the base polymer powder to which the hydrophobic inorganic particles are added, in the presence of a surface crosslinking solution including hydrophilic inorganic particles having a water contact angle of 10° or less, and a surface crosslinking agent of a C2-5 alkylene carbonate. Thereby, a surface crosslink layer having a thickness beyond a certain level may be uniformly formed, and a superabsorbent polymer exhibiting high gel strength, excellent permeability, etc. may be more effectively obtained.

In the surface crosslinking process, more suitable examples of the C2-5 alkylene carbonate that can be used as the surface crosslinking agent may include ethylene carbonate, propylene carbonate, butylene carbonate, etc., and two or more kinds selected among them may be used together.

Here, the content of the surface crosslinking agent may be appropriately controlled according to the kind of the crosslinking agent, reaction conditions, etc., and preferably, it may be controlled to 0.001 to 5 parts by weight, based on 100 parts by weight of the base polymer powder. If the content of the surface crosslinking agent is too low, surface modification may not be properly achieved, and thus the properties of the final polymer may be deteriorated. To the contrary, if an excessive amount of the surface crosslinking agent is used, due to an excessive surface crosslinking reaction, basic absorption performance of polymer may be deteriorated.

In the surface crosslinking process, the kinds of hydrophobic and/or hydrophilic inorganic particles that can be used are as explained above.

Further, in the surface crosslinking process, first, hydrophobic inorganic particles of a solid state may be mixed with a base polymer powder to treat the surface of the base polymer powder, and for the treatment method, a common dry treatment and/or mixing method of inorganic powders may be applied.

A method of adding a surface crosslinking solution including hydrophilic inorganic particles and a surface crosslinking agent to the base polymer powder is not specifically limited in terms of its construction. For example, a surface crosslinking solution and base polymer powder may be put in a reactor and mixed, a surface crosslinking solution may be sprayed on to the base polymer powder, or the base polymer powder and surface crosslinking solution may be continuously fed to a continuously operated mixer, and the like.

The hydrophobic inorganic particles and hydrophilic inorganic particles may be respectively used in the content of 0.0001 to 0.3 parts by weight, or 0.001 to 0.2 parts by weight, based on 100 parts by weight of the base polymer powder. Thereby, by the use of both inorganic particles, the permeability and various properties of the superabsorbent polymer may be more effectively improved. The superabsorbent polymer of one embodiment prepared using such contents of inorganic particles may also include hydrophobic and hydrophilic inorganic particles in the corresponding content ranges.

The surface crosslinking solution may further include water and/or a hydrophilic organic solvent. Thereby, the surface crosslinking agent and hydrophilic inorganic particles may be uniformly dispersed on the base polymer powder. Here, the content of the water and hydrophilic organic solvent based on 100 parts by weight of the base polymer powder may be controlled so as to induce uniform dispersion of the surface crosslinking agent and hydrophilic inorganic particles, prevent the agglomeration of the base polymer powder, and optimize the surface penetration depth of the surface crosslinking agent.

For the base polymer powder to which the surface crosslinking solution is added, a surface crosslinking reaction may be progressed at a maximum reaction temperature of 140° C. to 200° C., or 170° C. to 195° C., for 5 to 60 minutes, 10 to 50 minutes, or 20 to 45 minutes. More specifically, the surface crosslinking step may be progressed by raising a temperature from the initial temperature of 20° C. to 130° C., or 40° C. to 120° C., to the maximum reaction temperature, over 10 to 30 minutes, and maintaining the maximum temperature for 5 to 60 minutes to heat treat.

By fulfilling such surface crosslinking conditions (particularly, temperature rise conditions and reaction conditions at the maximum reaction temperature), a superabsorbent polymer appropriately fulfilling the properties of one embodiment may be more effectively prepared.

A temperature rise means for the surface crosslinking reaction is not specifically limited. A heating medium may be supplied, or a heat source may be directly supplied for heating. Here, the kinds of the heating medium that can be used may include a temperature-increased fluid such as steam, hot air, hot oil, etc., but are not limited thereto, and may be appropriately selected considering the means of the heating medium, temperature rise speed, and a temperature to be increased. The heat source directly supplied may include electric heating, gas heating, etc., but is not limited thereto.

The superabsorbent polymer prepared according to the above-explained method maintains excellent absorption performance such as centrifuge retention capacity, absorbency under pressure, etc., and fulfills more improved permeability, absorption speed, etc., thus fulfilling various properties of one embodiment, and it can be suitably used for hygienic goods such as a diaper, etc., and particularly, ultrathin hygienic goods with decreased pulp content.

Advantageous Effects

The superabsorbent polymer according to the present invention can maintain excellent basic absorption performance, and simultaneously, exhibit more improved absorption speed, permeability, etc., and it can be preferably used for hygienic goods such as a diaper with a thinner thickness.

EMBODIMENTS

Hereinafter, preferable examples are presented for better understanding of the present invention. However, these examples are presented only as illustrations of the present invention, and the present invention is not limited thereby.

In the following examples and comparative examples, water contact angles of hydrophobic inorganic particles and hydrophilic inorganic particles were measured as follows.

First, the hydrophobic inorganic particles were dispersed in a methylene chloride solvent at a concentration of 5 wt % to form a coating solution. The coating solution was spin coated on a wafer without surface roughness and then dried to remove remaining solvent. On the coating layer, water was dripped dropwise and the contact angle was measured. The measured contact angle was defined as a water contact angle of the hydrophobic inorganic particles, and the measured values are shown in the following Table 1.

Further, the water contact angel of the hydrophilic inorganic particles was measured by the same method as the method for the hydrophobic inorganic particles, except that a coating solution in which the hydrophilic inorganic particles were dissolved or dispersed in water at a concentration of 20 wt % was used.

TABLE 1

| Inorganic particles | Product name | Water contact angle (°) |
| --- | --- | --- |
| Hydrophobic inorganic particles | DM30S | 145 |
| | Aerogel | 148 |
| | R972 | 117 |
| Hydrophilic inorganic particles | ST-O | 3 |
| | ST-AK | 3 |

Example 1

As an apparatus for preparing a superabsorbent polymer, a continuous preparation apparatus performing a polymerization process, a hydrogel grinding process, a drying process, a grinding process, a sieving process, a surface crosslinking process, a cooling process, a sieving process, and a transportation process connecting each process, was used.

(Step 1)

100 parts by weight of acrylic acid were mixed with 0.4 parts by weight of a mixture of polyethylene glycol diacrylate (weight average molecular weight: ~500 g/mol) and allyl methacrylate as internal crosslinking agents, and 0.01 parts by weight of IRGACURE 819 as a photoinitiator to prepare a monomer solution. Subsequently, while the monomer solution was continuously fed with a metering pump, 160 parts by weight of a 24 wt % sodium hydroxide aqueous solution was line-mixed to prepare an aqueous solution of monomers. At this time, the temperature increase by the heat of neutralization was controlled to 40° C. After continuous line mixing of 6 parts by weight of 4 wt % sodium persulfate, the mixture was continuously fed to a continuous polymerization reactor having a planar polymerization belt equipped with embankments at both ends. Thereafter, UV was irradiated for 1 minute, and thermal polymerization was additionally progressed for 2 minutes to prepare a hydrogel. The moisture content of such hydrogel was confirmed to be 45 wt %.

(Step 2)

After cutting the hydrogel to an average size of about 300 mm or less, it was introduced into a grinder (equipped with a perforated plate including multiple holes with a diameter of 10 mm), and ground under each condition.

(Step 3)

Subsequently, the hydrogel ground in step 2 was dried in a dryer capable of transferring wind up and down. Hot air was flowed from the lower side to the upper side for 15 minutes, and was flowed again from the upper side to the lower side for 15 minutes, so that the moisture content of the dried powder became about 2% or less, thus uniformly drying the hydrogel.

(Step 4)

The polymer dried in step 3 was ground with a grinder and then sieved to obtain a base polymer with a size of 150 to 850 μm.

(Step 5)

Thereafter, into 100 parts by weight of the base polymer powder prepared in the step 4, 0.05 parts by weight of DM30S hydrophobic silica particles were introduced, and they was stirred at room temperature to mix the base polymer powder and hydrophobic silica particles, and dry treatment was progressed. Subsequently, 1 g of ethylene carbonate, and 0.2 g of an aqueous solution in which hydrophilic silica particles (ST-0) were dispersed in water at a concentration of 20 wt % were introduced into 3 g of water, and they were mixed to prepare a surface crosslinking solution. Thereafter, the surface crosslinking solution was sprayed to the base polymer powder, and they were stirred at room temperature and mixed so that the surface crosslinking solution was uniformly distributed on the base polymer powder. Subsequently, the base polymer powder mixed with the surface crosslinking solution was introduced into a surface crosslinking reactor, and a surface crosslinking reaction was progressed.

In the surface crosslinking reactor, it was confirmed that the temperature of the base polymer powder gradually increased from the initial temperature of around 80° C., and it was operated such that the maximum reaction temperature of 190° C. was reached after 30 minutes. After reaching such a maximum reaction temperature, additional reaction was progressed for 15 minutes, and then the finally prepared superabsorbent polymer sample was taken. After the surface crosslinking process, the sample was sieved with an ASTM standard sieve, to prepare a superabsorbent polymer of Example 1 having a particle diameter of 150 μm to 850 μm.

Example 2

A superabsorbent polymer of Example 2 was prepared by the same method as Example 1, except that 0.55 parts by weight of a mixture of polyethylene glycol diacrylate (weight average molecular weight: ~500 g/mol) and allyl methacrylate was used as the internal crosslinking agents.

Example 3

A superabsorbent polymer of Example 3 was prepared by the same method as Example 1, except that 0.55 parts by weight of a mixture of polyethylene glycol diacrylate (weight average molecular weight: ~500 g/mol) and allyl methacrylate was used as the internal crosslinking agents, and that the moisture content of the hydrogel was controlled to 50 wt % by controlling the concentration of sodium hydroxide in the sodium hydroxide aqueous solution.

Example 4

A superabsorbent polymer of Example 4 was prepared by the same method as Example 1, except that 0.75 parts by weight of a mixture of polyethylene glycol diacrylate (weight average molecular weight: ~500 g/mol) and allyl methacrylate was used as the internal crosslinking agents.

Example 5

A superabsorbent polymer of Example 5 was prepared by the same method as Example 1, except that 0.75 parts by weight of a mixture of polyethylene glycol diacrylate (weight average molecular weight: ~500 g/mol) and allyl methacrylate was used as the internal crosslinking agents, and that the moisture content of the hydrogel was controlled to 50 wt % by controlling the concentration of sodium hydroxide in the sodium hydroxide aqueous solution.

Example 6

A superabsorbent polymer of Example 6 was prepared by the same method as Example 1, except that 0.75 parts by weight of a mixture of polyethylene glycol diacrylate (weight average molecular weight: ~500 g/mol) and allyl methacrylate was used as the internal crosslinking agents, and that the moisture content of the hydrogel was controlled to 55 wt % by controlling the concentration of sodium hydroxide in the sodium hydroxide aqueous solution.

Comparative Example 1

A superabsorbent polymer of Comparative Example 1 was prepared by the same method as Example 1, except that in step 2, the hydrogel was cut to an average size of about 300 mm or less, and then introduced into a grinder (equipped with a perforated plate including multiple holes with a diameter of 16 mm) and ground.

Comparative Example 2

A superabsorbent polymer of Comparative Example 2 was prepared by the same method as Example 1, except that in step 1, 0.55 parts by weight of a mixture of polyethylene glycol diacrylate (weight average molecular weight: ~500 g/mol) and allyl methacrylate was used as the internal crosslinking agents, and the moisture content of the hydrogel was controlled to 50 wt % by controlling the concentration of sodium hydroxide in the sodium hydroxide aqueous solution, and in step 2, the hydrogel was cut to an average size of about 300 mm or less, and then introduced into a grinder (equipped with a perforated plate including multiple holes with a diameter of 16 mm) and ground.

Comparative Example 3

A superabsorbent polymer of Comparative Example 3 was prepared by the same method as Example 1, except that in step 1, 0.35 parts by weight of a mixture of polyethylene glycol diacrylate (weight average molecular weight: ~500 g/mol) and allyl methacrylate was used as the internal crosslinking agents.

Comparative Example 4

A superabsorbent polymer of Comparative Example 4 was prepared by the same method as Example 1, except that in step 1, 0.75 parts by weight of a mixture of polyethylene glycol diacrylate (weight average molecular weight: ~500 g/mol) and allyl methacrylate was used as the internal crosslinking agents, and the moisture content of the hydrogel was controlled to 60 wt % by controlling the concentration of sodium hydroxide in the sodium hydroxide aqueous solution.

Comparative Example 5

A superabsorbent polymer of Comparative Example 5 was prepared by the same method as Example 4, except that the hydrophobic silica particles and the aqueous solution of hydrophilic silica particles were not used in the step 5.

In Examples 1 to 6 and Comparative Examples 1 to 5, the gel strengths of the hydrogel before and after gel grinding were measured as follows, and the measurement results are summarized in the following Table 2.

* Measurement Method of Gel Strength of Hydrogel
A. Preparation of a Sample to be Measured First, a hydrogel to be measured (a hydrogel sheet before gel grinding and a hydrogel after gel grinding) was prepared with a diameter or about 2.5 cm and a thickness of about 2-5 mm. The prepared sample was loaded on a microbalance, and an appropriate amount of distilled water was uniformly sprayed thereto using a sprayer (the initial moisture content of the hydrogel was previously measured (moisture content measuring device condition: 180° C., 40 minutes) and the amount of water needed to adjust to the initial moisture content was calculated). In order to uniformly control the moisture content in the sample, it was sealed in plastic and stored at room temperature for more than 12 hours.

B. Measurement Method

The hydrogel sample of which moisture content was controlled was loaded between two plates of a rheometer (ARES-G2), and the two plates were pressurized with a force of 3 N and the gap was adjusted so that the sample came in contact with the plates. A rest time of 5 minutes stabilized the sample. For the measurement, first, while increasing strain at a frequency of 10 rad/s, the strain in the region of linear viscoelastic regime where storage modulus (G') and loss modulus (G") are constant was confirmed.

After finding the strain value (commonly 0.1%) in the linear regime region, viscoelasticity (G', G") was measured for 60 seconds at a constant frequency (10 rad/s). After measuring more than 2 times, the average value of G' was calculated as a gel strength (G').

TABLE 2

| Unit | Internal cross-linking agent ppm | Perforated plates mm | Moisture content of hydrogel % | Hydrogel strength before grinding Pa | Hydrogel strength after grinding Pa | Strength rate before and after grinding % | Hydrophobic inorganic particles Parts by weight | Hydrophilic inorganic particles Parts by weight |
|---|---|---|---|---|---|---|---|---|
| Example 1 | 4000 | 10 | 45 | 15300 | 10300 | 67 | 0.05 | 0.05 |
| Example 2 | 5500 | 10 | 45 | 22,200 | 15,940 | 71.8 | 0.05 | 0.05 |
| Example 3 | 5500 | 10 | 50 | 21,015 | 15,341 | 73 | 0.05 | 0.05 |
| Example 4 | 7500 | 10 | 45 | 26,300 | 21,620 | 82.2 | 0.05 | 0.05 |
| Example 5 | 7500 | 10 | 50 | 23100 | 19335 | 83.7 | 0.05 | 0.05 |
| Example 6 | 7500 | 10 | 55 | 20,100 | 17,590 | 87.5 | 0.05 | 0.05 |
| Comparative Example 1 | 4000 | 16 | 45 | 16,010 | 14,500 | 90.6 | 0.05 | 0.05 |
| Comparative Example 2 | 5500 | 16 | 50 | 20845 | 18850 | 90.4 | 0.05 | 0.05 |
| Comparative Example 3 | 3500 | 10 | 45 | 8500 | 7025 | 82.6 | 0.05 | 0.05 |
| Comparative Example 4 | 7500 | 10 | 60 | 19,280 | 17,650 | 91.5 | 0.05 | 0.05 |
| Comparative Example 5 | 7500 | 10 | 45 | 26,300 | 21,620 | 82.2 | 0 | 0 |

Referring to Table 2, in Examples 1 to 6, the hydrogels before gel grinding had gel strengths of 10,000 Pa or more because the content of the internal crosslinking agents, moisture contents, etc. were controlled, and the gel strengths after gel grinding fulfill the range of 35-90% of the gel strength before gel grinding because the diameter of the holes of the perforated plates of the gel grinder, moisture content, etc. were controlled. Further, in Examples 1 to 6, a surface crosslinking process was progressed using two predetermined kinds of inorganic particles and an alkylene carbonate surface crosslinking agent.

To the contrary, in Comparative Examples 1 and 2, the gel strength after gel grinding failed to fulfill the range of 35-90% of the gel strength before gel grinding because the diameter of the holes of the perforated plate of the gel grinder did not fall within an appropriate range, and in Comparative Example 3, the hydrogel before gel grinding had a gel strength less than 10,000 Pa because the total content range of the internal crosslinking agent did not fall within an appropriate range. Further, in Comparative Example 4, the gel strength after gel grinding failed to fulfill the range of 35-90% of the gel strength before gel grinding because the moisture content did not fall within an appropriate range, and in Comparative Example 5, two predetermined kinds of inorganic particles were not used during surface crosslinking.

Experimental Example

The properties of each superabsorbent polymer prepared in the examples and comparative examples were measured and evaluated as follows.

(1) Evaluation of Particle Diameter

The particle diameter of the base polymer powder and superabsorbent polymer used in the examples and comparative examples were measured according to EDANA (European Disposables and Nonwovens Association) standard EDANA WSP 220.3.

(2) Centrifuge Retention Capacity (CRC)

Centrifuge retention capacity (CRC) according to absorption rate under no load was measured according to EDANA (European Disposables and Nonwovens Association) standard EDANA WSP 241.3. $W_0$ (g, about 0.2 g) of the superabsorbent polymer was uniformly put in an envelope made of non-woven fabric, and the envelope was sealed. The envelope was soaked in a 0.9 wt % sodium chloride aqueous solution (saline solution) at room temperature. After 30 minutes, the envelope was drained at 250 G for 3 minutes using a centrifuge, and then the mass $W_2$ (g) of the envelope was measured. After the same operation without using a superabsorbent polymer, the mass $W_1$ (g) at that time was measured. Using the obtained weights, CRC (g/g) was calculated according to the following Calculation Formula 1, thus confirming centrifuge retention capacity.

$$CRC(g/g)=\{[W_2(g)-W_1(g)-W_0(g)]/W_0(g)\} \quad \text{[Calculation Formula 1]}$$

(3) Absorbency Under Pressure (AUP)

For the superabsorbent polymers of the examples and comparative examples, absorbency under pressure was measured according to EDANA (European Disposables and Nonwovens Association) standard EDANA WSP 242.3.

First, a 400 mesh wire netting made of stainless steel was installed on the bottom of a plastic cylinder with an internal diameter of 60 mm. Under the conditions of a temperature of 23±2° C. and relative humidity of 45%, $W_0$ (g, 0.16 g) of superabsorbent polymers obtained in Examples 1~6 and Comparative Examples 1~3 were uniformly scattered on the wire netting. Subsequently, a piston that could uniformly impart a load of 4.83 kPa (0.7 psi) was placed on the superabsorbent polymer. Here, as the piston, a piston having an outer diameter slightly smaller than 60 mm was used such that there was essentially no gap with the inner wall of the cylinder, and the upward and downward movement was not hindered. At this time, the weight $W_3$ (g) of the apparatus was measured.

Subsequently, a glass filter with a diameter of 125 mm and a thickness of 5 mm was positioned on the inner side of a Petri dish with a diameter of 150 mm, and a 0.90 wt % sodium chloride aqueous solution (saline solution) was poured on the petri dish until the water level of the saline solution became the same as the level of the upper side of the glass filter. Further, one filter paper with a diameter of 120 mm was placed thereon. The above-prepared measuring apparatus was mounted on the filter paper, and the superabsorbent polymer in the apparatus was allowed to absorb the solution under load for 1 hour. After 1 hour, the measuring apparatus was lifted, and the weight $W_4$ (g) of the apparatus was measured.

Using the measured weights, AUP (g/g) was calculated according to the following Calculation Formula 2, thus confirming absorbency under load.

$$AUP(g/g)=[W_4(g)-W_3(g)]/W_0(g) \quad \text{[Calculation Formula 2]}$$

In Calculation Formula 2, $W_0$ (g) is the initial weight (g) of the superabsorbent polymer, $W_3$ (g) is the sum of the weight of the superabsorbent polymer and the weight of the apparatus capable of imparting a load to the superabsorbent polymer, and $W_4$ (g) is the sum of the weight of the superabsorbent polymer and the weight of the apparatus capable of imparting a load to the superabsorbent polymer, after a saline solution is absorbed in the superabsorbent polymer under load (0.7 psi) for 1 hour.

(4) Gel Strength (G')

For the superabsorbent polymers of the examples and comparative examples, horizontal direction gel strength was measured.

First, the samples of the superabsorbent polymers of the examples and comparative examples were filtered with a sieve (30~50 mesh), and 0.5 g thereof were weighed. The weighed sample was sufficiently swollen in 50 g of a saline solution for 1 hour. Thereafter, non-absorbed solvent was removed using an aspirator for 4 minutes, and the solvent stained outside was uniformly distributed on a filter paper and cleaned off once.

2.5 g of the swollen superabsorbent polymer sample was positioned between two parallel plates (diameter 25 mm, with a wall of about 2 mm at the bottom, preventing the sample from escaping), and the interval between the two plates was adjusted to 1 mm. At this time, the parallel plates were pressurized with a force of about 3 N and the interval between the parallel plates was controlled so that the swollen superabsorbent polymer sample came in contact with the parallel plates.

While increasing shearing strain at an oscillation frequency of 10 rad/s using the rheometer, shearing strain was confirmed in the region of the linear viscoelastic regime where a storage modulus and a loss modulus are constant. In general, in the swollen superabsorbent polymer sample, there is 0.1% shearing strain in the linear viscoelastic regime region.

At a constant oscillation frequency of 10 rad/s, the storage modulus and loss modulus of the superabsorbent polymer swollen for 60 seconds under shearing strain of the linear viscoelastic regime region were measured. The obtained storage modulus values were averaged to calculate horizontal direction gel strength. For reference, the loss modulus was measured to be very small, compared to the storage modulus.

(5) Saline Flow Conductivity (SFC)

Saline flow conductivity was measured and calculated according to the method disclosed in columns 54 to 59 of U.S. Pat. No. 5,562,646.

(6) 30-second Absorption Speed

A 30-second absorption speed and porosity can be measured while swelling about 0.16 g of the superabsorbent polymer with a saline solution introduced through a mesh at the bottom of a cylinder under a pressurization condition of 0.3 psi. A height change of the upper plate of the rheometer according to the volume expansion of the superabsorbent polymer was measured in real time, and the height of the upper plate at 30 seconds was divided by an absorption time (30 seconds), thus measuring and calculating the 30-second absorption speed. The porosity can be calculated by calculating the total volume in the cylinder when the swelling of the superabsorbent polymer was finished (final absorption height*area of the lower part of the cylinder), and subtracting the amount of saline solution absorbed by the superabsorbent polymer, measured with a moisture content measuring device, from the above value.

(7) FSR (Free Swell Rate)

The FSR of the superabsorbent polymer was measured and calculated according to a method described in pages 22 to 23 of European Patent Laid-Open Publication No. 2535027.

The property values of Examples 1 to 6 and Comparative Examples 1 to 5 measured by the above method are summarized in the following Table 3.

TABLE 3

| Unit | CRC g/g | AUP g/g | Absorption degree g/g | porosity % | 30-second absorption speed mm/min | Gel strength Pa | SFC $\cdot 10^{-7}$ cm$^3 \cdot$ s/g | FSR g/g/s |
|---|---|---|---|---|---|---|---|---|
| Example 1 | 28.5 | 25.5 | 54.0 | 20.8 | 1.65 | 8880 | 48 | 0.33 |
| Example 2 | 27.7 | 24.0 | 51.7 | 21.6 | 2.63 | 9000 | 84 | 0.36 |
| Example 3 | 28.1 | 25.0 | 53.1 | 21.2 | 1.72 | 8500 | 58 | 0.32 |
| Example 4 | 26.5 | 23.6 | 50.1 | 25.2 | 2.46 | 13000 | 125 | 0.35 |
| Example 5 | 26.8 | 23.8 | 50.6 | 24.9 | 2.37 | 12100 | 120 | 0.33 |
| Example 6 | 27.7 | 23.8 | 51.5 | 24.5 | 1.95 | 11230 | 102 | 0.32 |
| Comparative Example 1 | 30.4 | 24.0 | 58.0 | 10.0 | 0.96 | 5130 | 10 | 0.25 |
| Comparative Example 2 | 29.8 | 24.2 | 54.0 | 17.9 | 1.05 | 7850 | 42 | 0.25 |
| Comparative Example 3 | 28.5 | 25.5 | 54.0 | 18.5 | 1.40 | 7280 | 36 | 0.28 |
| Comparative Example 4 | 28.5 | 24.0 | 52.5 | 22.0 | 1.45 | 9910 | 80 | 0.29 |
| Comparative Example 5 | 26.7 | 25.0 | 51.7 | 18.2 | 2.3 | 10230 | 39 | 0.32 |

Referring to Table 3, it was confirmed that Examples 1 to 6 not only have excellent basic absorption performances defined by an absorption degree, etc., but also have excellent permeability defined by SFC, and exhibit porosity beyond a certain level, and thus have an excellent absorption speed defined by a 30-second absorption speed or FSR.

To the contrary, it was confirmed that Comparative Examples 1 to 5 have inferior permeability or absorption speed, compared to the examples.

The invention claimed is:

1. A method for preparing a superabsorbent polymer, comprising:
    conducting crosslinking polymerization of water soluble ethylenically unsaturated monomers having acid groups of which at least a part are neutralized, in the presence of an internal crosslinking agent, to form a hydrogel polymer comprising a first crosslinked polymer and having a gel strength of 10,000 Pa or more;
    gel grinding the hydrogel polymer such that gel strength after the grinding becomes 35% to 90% of gel strength before the grinding;
    drying, grinding, and sieving the gel ground hydrogel polymer to form a base polymer powder;
    adding hydrophobic inorganic particles having a water contact angle of 50° or more to the base polymer powder; and
    heat treating the base polymer powder to which the hydrophobic inorganic particles are added, to progress surface crosslinking, in the presence of a surface crosslinking solution comprising hydrophilic inorganic particles having a water contact angle of 10° or less, and a surface crosslinking agent of a C2-5 alkylene carbonate.

2. The method according to claim 1, wherein the internal crosslinking agent comprises a polyol poly(meth)acrylate first internal crosslinking agent and an allyl (meth)acrylate second internal crosslinking agent, and
    wherein the contents of the first and second internal crosslinking agents is 0.4 to 2 parts by weight, based on 100 parts by weight of a monomer composition comprising the internal crosslinking agents and the water soluble ethylenically unsaturated monomers.

3. The method according to claim 1, wherein during the gel grinding, the hydrogel polymer has a moisture content of 38 to 58 wt %, and the hydrogel polymer is gel ground through an extruder equipped with a perforated plate having multiple holes of a diameter of 9 to 15 mm.

4. The method according to claim 1, wherein during the grinding and sieving, the base polymer power having a particle diameter of 150 to 850 µm is formed.

5. The method according to claim 1, wherein the hydrophobic inorganic particles comprise one or more of silica particles, titania particles, or zirconia particles, and the hydrophilic inorganic particles comprise one or more of silica particles, titania particles, zirconia particles, or laponite particles.

6. The method according to claim 1, wherein the surface crosslinking is progressed by raising the temperature from an initial temperature of 20° C. to 130° C. to a maximum temperature of 140° C. to 200° C. over 10 to 30 minutes, and maintaining the maximum temperature for 5 to 60 minutes, thus heat treating.

* * * * *